(Model.)

J. HUTCHINS.
VEHICLE SPRING.

No. 265,812. Patented Oct. 10, 1882.

Witnesses
Edwin L. Yewell.
J. J. McCarthy.

Inventor.
Joseph Hutchins
By E. M. Alexander
Attorney.

UNITED STATES PATENT OFFICE.

JOSEPH HUTCHINS, OF MIDDLEBURY, INDIANA.

VEHICLE-SPRING.

SPECIFICATION forming part of Letters Patent No. 265,812, dated October 10, 1882.

Application filed February 28, 1882. (Model.)

*To all whom it may concern:*

Be it known that I, JOSEPH HUTCHINS, of Middlebury, in the county of Elkhart, and in the State of Indiana, have invented certain new and useful Improvements in Buggy-Springs; and I do hereby declare that the following is a full, clear, and exact description thereof, reference being had to the accompanying drawings, and to the letters of reference marked thereon, making a part of this specification.

This invention relates to certain improvements in that class of side-bar vehicles in which a longitudinal spring is employed to support the body of the vehicle; and it has for its objects to provide a spring of improved construction, whereby the greatest freedom is given to the movement of the body, and also to provide certain improvements by means of which the motion of the spring may be equalized, as more fully hereinafter specified. These objects I attain by the means illustrated in the accompanying drawings, in which—

Figure 1:
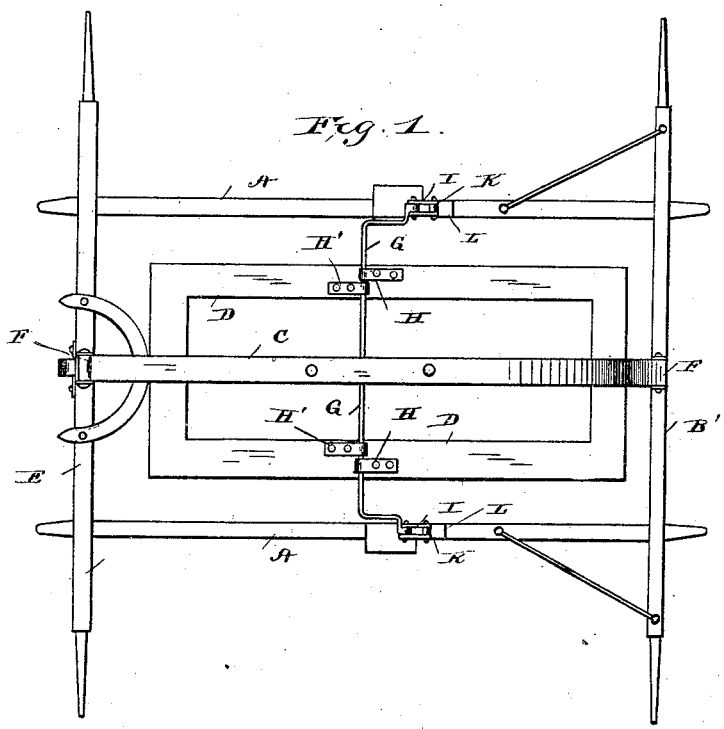
Figure 2:
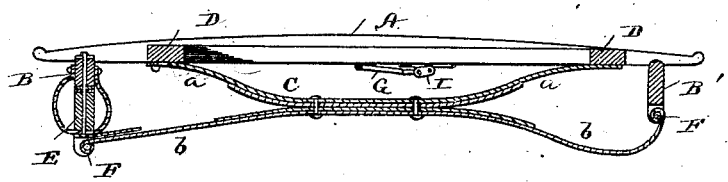
Figure 3:
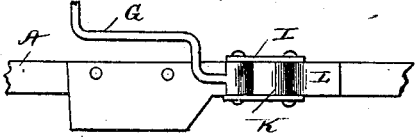
Figure 4:
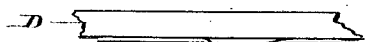

Figure 1 represents a bottom view of the truck of my improved vehicle; Fig. 2, a longitudinal sectional view of the truck, and Figs. 3 and 4 detached views of a portion of the equalizer.

The letter A indicates the side bars of the vehicle, which are secured to the bolster B and rear axle, B', in the usual manner.

The letter C indicates the spring, which is constructed in two parts, *a b*, to the upper one of which the frame D of the body of the vehicle is attached, the forward end being slotted to allow it to slip on its bolt and permit the spring to work freely. The lower part of the spring at its forward end is attached to the axle E, and at its rear end to the axle B', the said rear end being curved to give the frame full play, as indicated. The lower spring at its respective ends is attached by means of shackles F in order that it may work freely.

The letter G indicates a transverse rod pivoted to the frame D by means of the brackets H, so that it will rock freely, and H' two flat springs which bear upon the rod to prevent rattling. The rod G may be rigidly attached to the brackets, instead of being pivoted, in order that the bent ends may act torsionally, as equalizers, in some instances. The said bar is bent at or about right angles near its ends, which are pivoted to the links I, which are in turn pivoted to the hangers K on the plates L, secured to the side bars. The parts of the spring may be each constructed of a single leaf, or of two or more, as may desired, and one or more equalizers may be employed, as circumstances may require.

It will be seen that by means of the equalizer, which consists of the bar G and its connections, the body of the vehicle will be supported equally at each side, and will ride vertically upon the spring. By the peculiar construction of the spring an easy and comfortable motion is obtained, and the curve at the rear of the spring permits the body to have full play in descending.

Having thus fully described my invention, what I claim, and desire to secure by Letters Patent, is—

1. The combination, with the truck A and the body-frame D of the vehicle, and the central longitudinal springs, *a* and *b*, connected respectively with the frame and the axles, of the transverse torsional spring-bar G, adapted to centrally support the body, and pivoted to the side bars by the links I and hangers K, whereby a perpendicular play of the body is obtained, substantially as shown and specified.

2. In combination with the truck and body-frame, the longitudinal spring and transverse rod and brackets, the flat springs bearing upon said rod to prevent rattling, substantially as specified.

In testimony whereof I affix my signature, in presence of two witnesses, this 21st day of February, 1882.

JOSEPH HUTCHINS.

Witnesses:
GEORGE W. CHURCH,
GEORGE GOHN.